United States Patent
Kim et al.

(10) Patent No.: US 10,556,499 B2
(45) Date of Patent: Feb. 11, 2020

(54) APPARATUS FOR COOLING MOTOR OF HYBRID VEHICLE

(71) Applicants: Hyundai Motor Company, Seoul (KR); Kia Motors Corporation, Seoul (KR)

(72) Inventors: Jong Hyun Kim, Gyeonggi-do (KR); Hak Sung Lee, Gyeonggi-do (KR); Yeon Ho Kim, Gyeonggi-do (KR); Tae Ho Kim, Seoul (KR); Sung Hyun Ahn, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 241 days.

(21) Appl. No.: 15/824,488

(22) Filed: Nov. 28, 2017

(65) Prior Publication Data

US 2019/0077248 A1 Mar. 14, 2019

(30) Foreign Application Priority Data

Sep. 11, 2017 (KR) .................. 10-2017-0115627

(51) Int. Cl.

| | |
|---|---|
| *H02K 9/00* | (2006.01) |
| *B60K 11/02* | (2006.01) |
| *B60K 6/26* | (2007.10) |
| *B60K 6/38* | (2007.10) |
| *B60K 6/405* | (2007.10) |
| *H02K 5/20* | (2006.01) |
| *H02K 7/00* | (2006.01) |
| *H02K 9/19* | (2006.01) |
| *B60K 1/00* | (2006.01) |

(52) U.S. Cl.
CPC .............. *B60K 11/02* (2013.01); *B60K 6/26* (2013.01); *B60K 6/38* (2013.01); *B60K 6/405* (2013.01); *H02K 5/20* (2013.01); *H02K 7/006* (2013.01); *H02K 9/19* (2013.01); *B60K 2001/006* (2013.01); *B60Y 2200/92* (2013.01); *B60Y 2400/60* (2013.01); *Y10S 903/906* (2013.01); *Y10S 903/912* (2013.01); *Y10S 903/952* (2013.01)

(58) Field of Classification Search
CPC . H02K 7/006; H02K 9/19; H02K 5/20; B60K 11/02; B60K 6/26
USPC ........................................ 310/52, 54, 58, 64
See application file for complete search history.

(56) References Cited

U.S. PATENT DOCUMENTS

| | | | |
|---|---|---|---|
| 7,545,060 B2 * | 6/2009 | Ward ................. | H02K 3/24 310/260 |
| 2012/0049667 A1* | 3/2012 | Iwase .................. | H02K 5/20 310/54 |
| 2014/0339934 A1* | 11/2014 | Yoshiizumi ........... | H02K 9/19 310/54 |

FOREIGN PATENT DOCUMENTS

KR 2017-0074795 A 6/2017

* cited by examiner

*Primary Examiner* — Hanh N Nguyen
(74) *Attorney, Agent, or Firm* — Mintz Levin Cohn Ferris Glovsky and Popeo, P.C.; Peter F. Corless

(57) ABSTRACT

An apparatus for cooling a motor of a hybrid vehicle includes a support ring that is disposed between a motor casing and a motor and has a shape that encloses the motor. A water jacket is formed in the support ring and circulates cooling water and an oil jacket is formed in a support ring and circulates oil. Further, oil is discharged from the oil jacket is sprayed onto the motor to enable the oil to be used to cool the motor and to enable cooling water to be used to (Continued)

cool the motor. Accordingly, the performance of cooling the motor is enhanced.

8 Claims, 4 Drawing Sheets

APPARATUS FOR COOLING MOTOR OF HYBRID VEHICLE

CROSS REFERENCE TO RELATED APPLICATION

The present application claims priority to Korean Patent Application No. 10-2017-0115627 filed on Sep. 11, 2017, the entire contents of which is incorporated herein for all purposes by this reference.

BACKGROUND

1. Field of the Disclosure

The present disclosure relates to an apparatus for reducing the temperature of a motor of a hybrid vehicle, and more particularity, to an apparatus for reducing the motor temperature of a hybrid vehicle using transmission oil and cooling water.

2. Description of the Related Art

Typically, in a dry double-clutch transmission (DCT) hybrid vehicle, a dry engine clutch and a motor are positioned adjacent to an engine to connect or disconnect power between the engine and the motor. A dry double-clutch is disposed adjacent to a transmission to transmit the power of the engine or the motor to wheels based on the gear stage of the transmission. In a structure that has the motor and the transmission integrated with each other, the motor is directly cooled using transmission oil.

However, when the motor is disposed between the dry engine clutch and the dry double-clutch, it is difficult to cool the motor using the transmission oil. Accordingly, a structure for cooling the motor using water was proposed by position the dry engine clutch and the dry double-clutch in front and rear of the motor. However, this structure indirectly cools the motor and therefore provides an insufficient cooling effect.

The contents described as the related art have been provided merely to aid in the understanding of the background of the present disclosure, and should not be considered as corresponding to the related art known to those skilled in the art.

SUMMARY

The present disclosure provides an apparatus for reducing a temperature of a motor of a hybrid vehicle using transmission oil and cooling water and reduces the temperature of the oil using the cooling water.

According to an exemplary embodiment of the present disclosure, an apparatus for reducing a temperature of a motor of a hybrid vehicle may include a support ring disposed between a motor casing and a motor and having a shape that encloses the motor, a water jacket formed in the support ring and configured to circulate cooling water, and an oil jacket formed in the support ring and configured to circulate oil.

In some exemplary embodiments, the oil jacket may be formed adjacent to the water jacket in an axial direction of the motor. The motor casing may be disposed between an engine clutch disposed at a first side of the motor casing and a transmission clutch disposed at a second side of the motor casing. Additionally, the motor may be disposed in the motor casing. An oil passage may be formed in the support ring to provide fluid communication between the oil jacket and an internal cavity of the motor casing. An oil outlet may be formed in a lower end of the motor casing.

In other exemplary embodiments, the motor casing may include a front casing formed in a shape that encloses the support ring and positioned toward the engine clutch and a rear casing coupled to the front casing and a transmission casing and positioned toward the transmission clutch. In some exemplary embodiments, the apparatus may further include an oil seal provided to seal each cavity between the front casing and a motor input shaft coupled to a rotor of the motor and between the rear casing and the motor input shaft.

In addition, an inlet and an outlet of the water jacket may extend through the motor casing and extend to the support ring. An inlet of the oil jacket may extend through the motor casing and extend to the support ring. In some exemplary embodiments of the present disclosure, a water jacket and an oil jacket may be formed in a support ring and oil discharged from the oil jacket may be sprayed onto the motor. Therefore, the oil may be used to reduce the temperature of the motor and the cooling water may be used to reduce the temperature of the motor, whereby the performance of reducing the temperature the motor may be enhanced.

BRIEF DESCRIPTION OF THE DRAWINGS

The above and other objects, features and other advantages of the present disclosure will be more clearly understood from the following detailed description when taken in conjunction with the accompanying drawings, in which.

DETAILED DESCRIPTION

Figure 1:
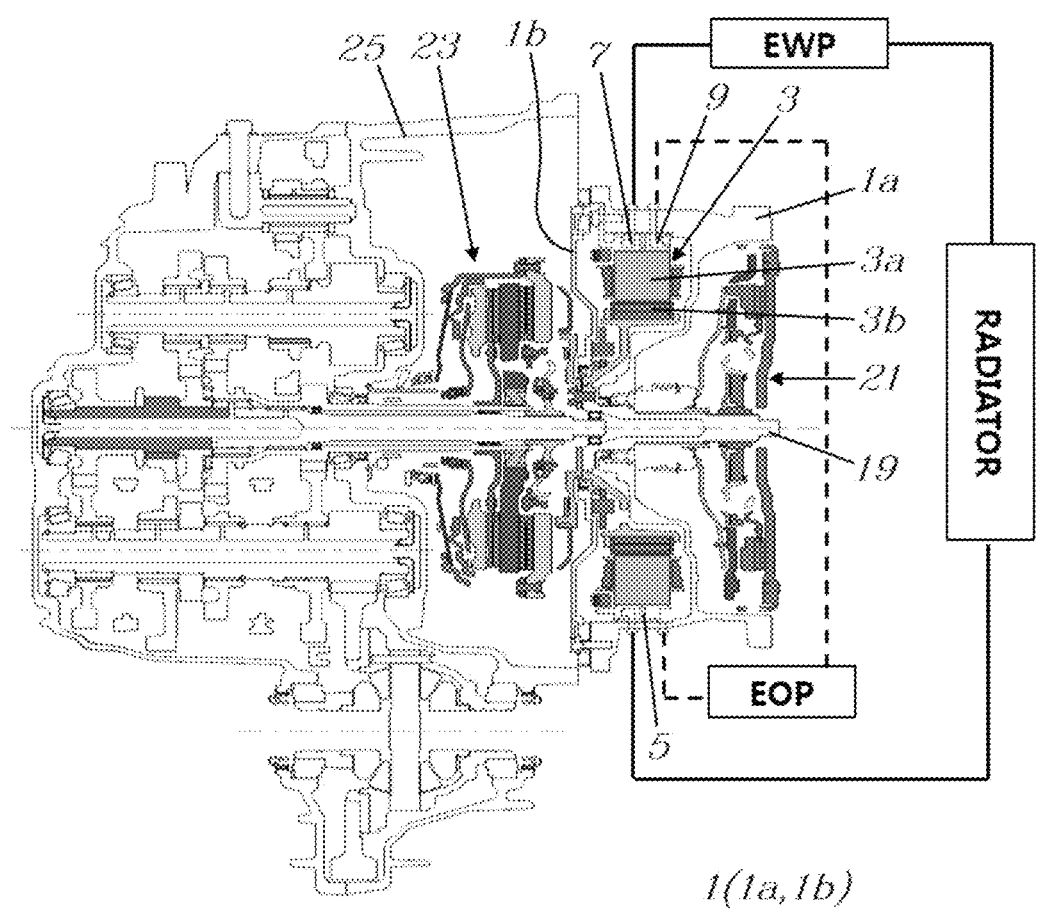
FIG. 1 is an exemplary sectional view illustrating an internal structure of a transmission for hybrid vehicles according to an exemplary embodiment of the present disclosure.

Hereinafter, an exemplary embodiment of the present disclosure will be described in detail with reference to the accompanying drawings. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other exemplary embodiments, which may be included within the spirit and scope of the invention as defined by the appended claims.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. For example, in order to make the description of the present invention clear, unrelated parts are not shown and, the thicknesses of layers and regions are exaggerated for clarity. Further, when it is stated that a layer is "on" another layer or substrate, the layer may be directly on another layer or substrate or a third layer may be disposed there between.

It is understood that the term "vehicle" or "vehicular" or other similar term as used herein is inclusive of motor vehicle in general such as passenger automobiles including sports utility vehicles (SUV), buses, trucks, various commercial vehicles, watercraft including a variety of boats, ships, aircraft, and the like and includes hybrid vehicles, electric vehicles, combustion, plug-in hybrid electric vehicles, hydrogen-powered vehicles and other alternative fuel vehicles (e.g. fuels derived from resources other than petroleum).

An apparatus for cooling a motor of a hybrid vehicle according to an exemplary embodiment of the present disclosure may include a support ring 5, a water jacket 7, and an oil jacket 9. The present disclosure will be described in more detail with reference to FIG. 1. First, the support ring 5 may be disposed between a motor casing 1 and a motor 3 in a shape that encloses the motor 3. The water jacket 7 may be formed in the support ring 5 to circulate cooling water and the oil jacket 9 may be formed in the support ring 5 to circulate oil. For example, the cooling water may be circulated by an electric water pump (EWP), and the oil may be circulated by an electric oil pump (EOP).

In particular, a rotor 3b of the motor 3 may be coupled to a motor input shaft 19. The support ring 5 may be disposed between a stator 3a of the motor 3 and the motor casing 1 to support the motor 3. The motor casing 1 may be coupled to a first side (e.g., one) side of a transmission casing 25 and provided in a shape having the motor casing 1 integrated with the transmission. In other words, since both the water jacket 7 for circulation of cooling water and the oil jacket 9 for circulation of oil are formed in the support ring 5, the motor 3 may be cooled by oil and cooling water. Accordingly, the performance of cooling the motor 3 may be improved.

Figure 2:
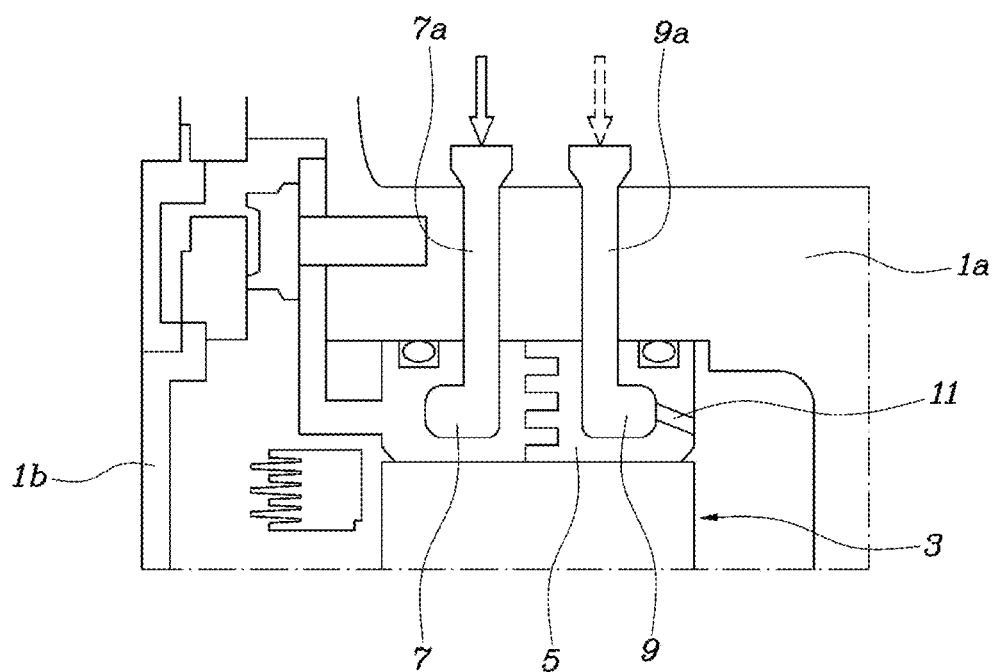
FIG. 2 is an exemplary diagram illustrating a structure for introducing cooling water and oil to reduce the temperature of a motor according to the present disclosure.

Referring to FIGS. 1 and 2, in the present disclosure, the oil jacket 9 may be formed adjacent to the water jacket 7 with respect to the axial direction of the motor 3. For example, when the oil jacket 9 is formed adjacent to the engine, the water jacket 7 may be formed adjacent to the transmission along the axial direction of the motor input shaft 19. The water jacket 7 may be formed at a position adjacent to the oil jacket 9. Therefore, due to heat exchange between cooling water flowing in the water jacket 7 and oil flowing in the oil jacket 9, the oil may be indirectly cooled, thus providing an improvement in the performance of cooling the motor 3.

Furthermore, the motor casing 1 may be disposed to have a structure obstructed at a first (e.g., one) side thereof from the engine clutch 21 and obstructed at a second (e.g., the other) side thereof from the transmission clutch 23. The motor 3 may be disposed in the motor casing 1. In particular, an oil passage 11 may be formed in the support ring 5 to enable the oil jacket 9 to be in fluid communication with an internal cavity of the motor casing 1 through the oil passage 11. In other words, oil drawn into the oil jacket 9 may be discharged into the internal cavity of the motor casing 1 through the oil passage 11. The oil that has been discharged into the internal cavity of the motor casing 1 may be sprayed onto the motor 3. Accordingly, the operation of cooling the motor 3 using oil may be performed.

Figure 3:
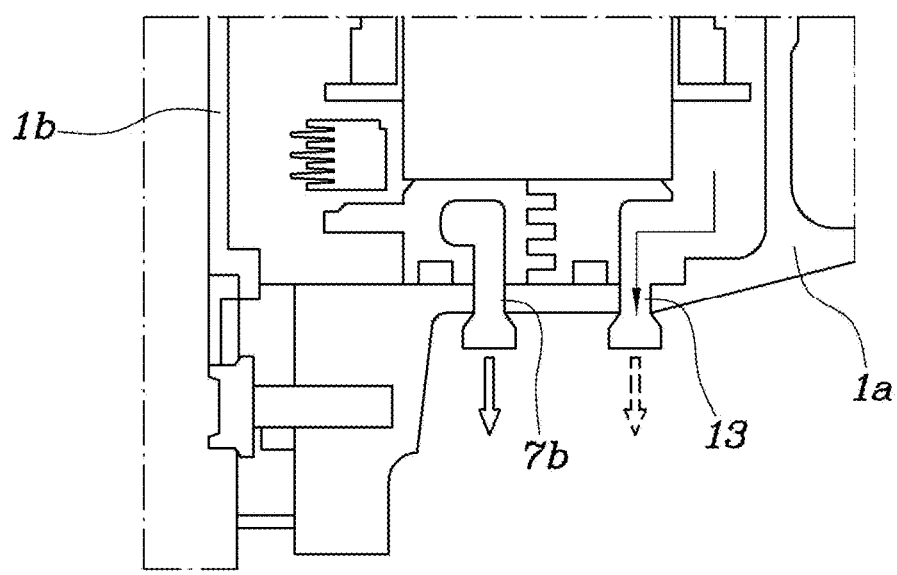
FIG. 3 is an exemplary diagram illustrating a structure for discharging cooling water and oil that have been used to reduce the temperature of the motor according to an exemplary embodiment of the present disclosure.

As shown in FIGS. 1 and 3, an oil outlet 13 may be formed in a lower end of the motor casing 1. In other words, oil that has been sprayed into the motor casing 1 and used to cool the motor 3 may flow out of the motor casing 1 through the oil outlet 13 and may continue to circulate.

Figure 4:
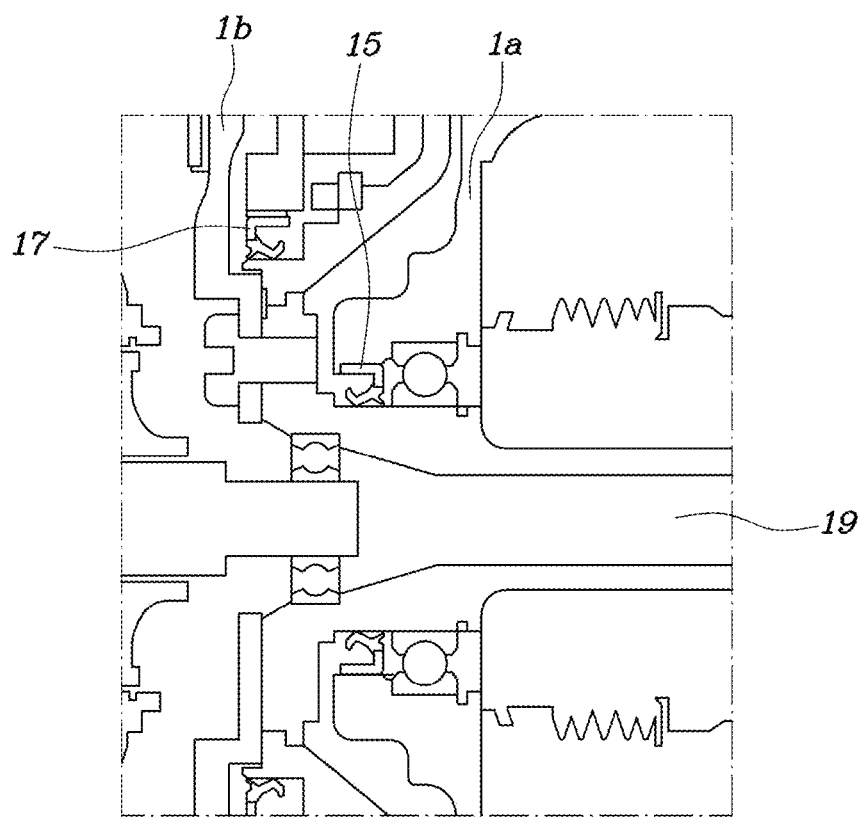
FIG. 4 is an exemplary diagram illustrating a structure for preventing oil used to reduce the temperature of the motor from leaking out of a motor casing according to an exemplary embodiment of the present disclosure.

Referring to FIGS. 1 and 4, the motor casing 1 may include a front casing 1a and a rear casing 1b. The front casing 1a may be formed in a shape that encloses the support ring 5 and positioned toward the engine clutch 21. The rear casing 1b may be coupled to the front casing 1a at a side thereof adjacent to the engine and coupled to the transmission casing 25 at a side thereof adjacent to the transmission. The rear casing 1b may be positioned toward the transmission clutch 23. Both the engine clutch 21 and the transmission clutch 23 may be dry clutches. The transmission clutch 23 may be a double-clutch which is used in a double-clutch transmission (DCT).

In particular, the present disclosure may include an oil seal to prevent oil discharged into the motor casing 1 from leaking out of the motor casing 1. For example, a first oil seal 15 may be disposed between the front casing 1a and the motor input shaft 19 coupled to the rotor 3b of the motor 3. A second oil seal 17 may be disposed between the motor input shaft 19 and the rear casing 1b. The first and second oil seals 15 and 17 may provide a seal to prevent leakage of oil. Therefore, oil in the motor casing 1 may be prevented from being drawn into the engine clutch 21 or the transmission clutch 23, whereby the operation of directly cooling the motor 3 using oil may be performed without leakage of oil.

Further, referring to FIG. 1, an inlet 7a and an outlet 7b of the water jacket 7 may extend through the motor casing 1 to the support ring 5. Additionally, an inlet 9a of the oil jacket 9 may extend through the motor casing 1 to the support ring 5. For example, cooling water may flow through the front casing 1a of the motor casing 1 and flow into the water jacket 7, and cooling water in the water jacket 7 may flow through the front casing 1a again and flow out of the motor casing 1. Furthermore, oil may pass through the front casing 1a and flow into the oil jacket 9. As described above in the present disclosure, the water jacket 7 and the oil jacket 9 may be formed in the support ring 5, and oil discharged from the oil jacket 9 may be sprayed onto the motor 3. Therefore, oil may be used to cool the motor 3, and cooling water may also be used to cool the motor 3. As a result, the performance of cooling the motor 3 may be enhanced.

Although an exemplary embodiment of the present disclosure has been described for illustrative purposes, those skilled in the art will appreciate that various modifications, additions and substitutions are possible, without departing from the scope and spirit of the invention as disclosed in the accompanying claims.

What is claimed is:

1. An apparatus for cooling a motor of a hybrid vehicle, comprising:
   a support ring disposed between a motor casing and a motor and having a shape that encloses the motor,
   a water jacket formed in the support ring and configured to circulate cooling water, and
   an oil jacket formed in the support ring and configured to circulate oil.

2. The apparatus according to claim 1, wherein the oil jacket is formed adjacent to the water jacket in an axial direction of the motor.

3. The apparatus according to claim 1,
wherein the motor casing is disposed between an engine clutch positioned at a first side of the engine clutch and a transmission clutch positioned at a second side of the engine clutch,
wherein the motor is disposed in the motor casing, and
wherein an oil passage is formed in the support ring to provide fluid communication between that the oil jacket and an internal cavity of the motor casing.

4. The apparatus according to claim 3, wherein an oil outlet is formed in a lower end of the motor casing.

5. The apparatus according to claim 3, wherein the motor casing includes a front casing formed in a shape that encloses the support ring and positioned toward the engine clutch; and a rear casing coupled to the front casing and a transmission casing and positioned toward the transmission clutch.

6. The apparatus according to claim 5, further comprising: an oil seal that seals each cavity disposed between the front casing and a motor input shaft coupled to a rotor of the motor and disposed between the rear casing and the motor input shalt.

7. The apparatus according to claim 6, further comprising: a second oil seal disposed between the motor input shaft and the rear casing.

8. The apparatus according to claim 1,
wherein an inlet and an outlet of the water jacket are positioned to extend through the motor casing and to the support ring, and
wherein an inlet of the oil jacket are positioned to extend through the motor casing and to the support ring.

\* \* \* \* \*